United States Patent
Heinrich et al.

(10) Patent No.: US 6,944,424 B2
(45) Date of Patent: Sep. 13, 2005

(54) RFID TAG HAVING COMBINED BATTERY AND PASSIVE POWER SOURCE

(75) Inventors: Harley Kent Heinrich, Brewster, NY (US); Vijay Pillai, White Plains, NY (US)

(73) Assignee: Intermec IP Corp., Woodland Hills, CA (US)

( * ) Notice: Subject to any disclaimer, the term of this patent is extended or adjusted under 35 U.S.C. 154(b) by 506 days.

(21) Appl. No.: 09/911,598

(22) Filed: Jul. 23, 2001

(65) Prior Publication Data

US 2003/0017804 A1 Jan. 23, 2003

(51) Int. Cl.$^7$ ................................................. H04B 5/00
(52) U.S. Cl. .................... 455/41.1; 455/41.2; 340/10.1; 340/693.1
(58) Field of Search ................................ 455/41.1, 41.2, 455/39; 340/10.1, 10.3, 572.1, 5.6, 5.61, 5.64, 693.1, 693.2, 693.3, 5.62, 693.4

(56) References Cited

U.S. PATENT DOCUMENTS

| | | | |
|---|---|---|---|
| 4,724,427 A | | 2/1988 | Carroll |
| 5,300,875 A | | 4/1994 | Tuttle |
| 5,552,641 A | * | 9/1996 | Fischer et al. .............. 307/10.5 |
| 5,850,181 A | * | 12/1998 | Heinrich et al. .......... 340/572.1 |
| 6,046,676 A | | 4/2000 | Ward et al. |
| 6,243,013 B1 | * | 6/2001 | Duan et al. ............... 340/572.7 |
| 6,249,227 B1 | * | 6/2001 | Brady et al. .............. 340/572.1 |
| 6,282,407 B1 | * | 8/2001 | Vega et al. ................. 455/41.1 |
| 6,329,915 B1 | * | 12/2001 | Brady et al. .............. 340/572.1 |
| 6,400,274 B1 | * | 6/2002 | Duan et al. ............... 340/572.7 |
| 6,462,647 B1 | * | 10/2002 | Roz .......................... 340/10.1 |
| 6,476,708 B1 | * | 11/2002 | Johnson .................... 340/10.34 |
| 6,593,845 B1 | * | 7/2003 | Friedman et al. ......... 340/10.33 |
| 6,690,182 B2 | * | 2/2004 | Kelly et al. .................. 324/700 |
| 6,720,866 B1 | * | 4/2004 | Sorrells et al. ............ 340/10.4 |
| 2002/0126013 A1 | * | 9/2002 | Bridgelall ................. 340/572.1 |

\* cited by examiner

*Primary Examiner*—CongVan Tran
(74) *Attorney, Agent, or Firm*—O'Melveny & Myers LLP

(57) ABSTRACT

An RFID tag is powered both by an internal battery and passively by an interrogating RF field. As a result, the RFID tag can be passively powered after the internal battery has been depleted. More particularly, an embodiment of the RFID tag includes electronic circuitry to provide RFID functionality, and an energy storage device coupled to the electronic circuitry to provide an operational voltage thereto. A battery is operatively coupled to the energy storage device to charge the energy storage device. A rectified RF power source derived from an interrogating RF field is also operatively coupled to the energy storage-device to charge the energy storage device. The rectified RF power source and the battery are electrically separated from each other. The energy storage device remains charged by the battery in the absence of the RF interrogating field while the battery has remaining capacity. After the battery has become depleted, the energy storage device is charged by the presence of the RF interrogating field.

16 Claims, 1 Drawing Sheet

RFID TAG HAVING COMBINED BATTERY AND PASSIVE POWER SOURCE

BACKGROUND OF THE INVENTION

1. Field of the Invention

The present invention relates to radio frequency (RF) transponders, and more particularly, to a radio frequency identification (RFID) transponder that is powered by an internal battery and also has an ability to passively recover power from an interrogating RF field after the internal battery has become depleted.

2. Description of Related Art

In the automatic data identification industry, the use of RFID transponders (also known as RFID tags) has grown in prominence as a way to track data regarding an object to which the RFID transponder is affixed. An RFID tag generally includes a semiconductor memory in which digital information may be stored, such as an electrically erasable, programmable read-only memory (EEPROM) or similar electronic memory device. An RFID interrogator or reader may recover the digital information stored in the RFID tag using modulated radio frequency (RF) signals. One such communication technique is referred to as "backscatter modulation," by which an RFID tag transmits stored data by reflecting varying amounts of an electromagnetic field provided by the RFID interrogator by modulating the antenna matching impedance of the tag. The RFID tag can therefore operate independently of the frequency of the energizing field, and as a result, the interrogator may operate at multiple frequencies so as to avoid RF interference, such as utilizing frequency hopping spread spectrum modulation techniques. Since RFID tags using backscatter modulation do not include a radio transceiver, they can be manufactured in very small, lightweight and hence inexpensive units.

RFID tags either extract their power from the electromagnetic field provided by the interrogator (also known as passive RFID tags), or include their own internal power source (e.g., battery). Passive RFID tags that extract their power from the interrogating field are particularly cost effective since they lack a power source, and can be constructed in smaller package sizes. A drawback of passive RFID tags is that they tend to require a shorter distance between the RFID tag and the RFID reader (known as the read range) in comparison to battery-powered RFID tags. Unlike passive RFID tags, battery-powered RFID tags have a limited life expectancy. Once the internal battery becomes depleted, the RFID tag becomes unusable. Since most batterypowered RFID tags are not designed to permit replacement of the battery, the RFID tag is usually discarded upon depletion of the battery and information stored in the RFID tag memory is irretrievably lost. In some cases, it may be critically important to recover the information stored in the RFID tag, thereby requiring the RFID tag to be disassembled to apply power to the electronic devices therein.

Accordingly, it would be desirable to provide an RFID tag having the attributes of both battery-powered and passively-powered tags. It would further be desirable to provide a battery-powered RFID tag that can be passively-powered after the battery becomes depleted so that stored information can be easily recovered.

SUMMARY OF THE INVENTION

The present invention provides an RFID tag that is powered both by an internal battery and passively by an interrogating RF field. As a result, the RFID tag can be passively powered after the internal battery has been depleted.

More particularly, an embodiment of the RFID tag includes electronic circuitry to provide RFID functionality, and an energy storage device coupled to the electronic circuitry to provide an operational voltage thereto. A battery is operatively coupled to the energy storage device to charge the energy storage device. A rectified RF power source derived from an interrogating RF field is also operatively coupled to the energy storage device to charge the energy storage device. The rectified RF power source and the battery are electrically separated from each other. The energy storage device remains charged by the battery in the absence of the RF interrogating field while the battery has remaining capacity. After the battery has become depleted, the energy storage device is charged by the presence of the RF interrogating field.

A more complete understanding of the RFID tag having a combined battery and passive power source will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for an RFID tag having the attributes of both battery-powered and passively-powered tags. In the detailed description that follows, like element numerals are used to describe like elements illustrated in one or more of the figures.

Figure 1:
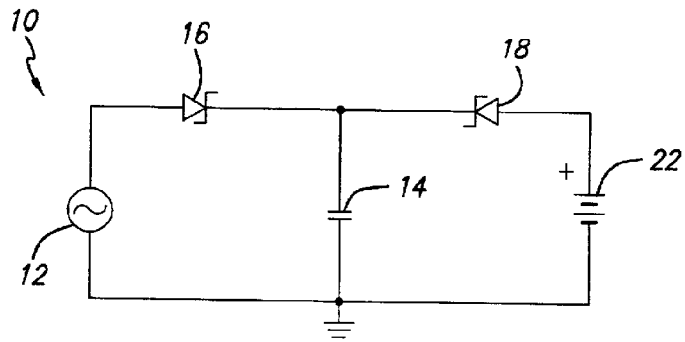
FIG. 1 is a block diagram of an embodiment of a dual power mode circuit for an RFID tag in accordance with the present invention.

Referring first to FIG. 1, a block diagram of an embodiment of a dual power mode circuit 10 for an RFID tag in accordance with the present invention is illustrated. The dual power mode circuit 10 includes an RF source 12, an energy storage capacitor 14, a first diode 16, a second diode 18, and a battery 22. The RF source 12 is provided by the interrogating RF field transmitted by an RFID reader, that is rectified by the RF front end of the RFID tag (not shown in FIG. 1). The energy storage capacitor 14 serves as a voltage source for the remaining circuitry of the RFID tag (not shown in FIG. 1), and is coupled to the RF source 12 and the battery 22 in separate, respective charging circuits. More particularly, a first charging circuit includes the RF source 12, the first diode 16, and the energy storage capacitor 14. The first diode 16 is coupled between the RF source 12 and the energy storage capacitor 14 in a forward biased manner so that current from the RF source 12 flows to the energy storage capacitor 14, and not in reverse. A second charging circuit includes the battery 22, the second diode 18, and the energy storage capacitor 14. The second diode 18 is coupled between the battery 22 and the energy storage capacitor 14 in a forward biased manner so that current from the battery 22 flows to the energy storage capacitor 14, and not in reverse. In a preferred embodiment of the invention, the first and second diodes 16, 18 are provided by Schottky diodes.

Figure 2:
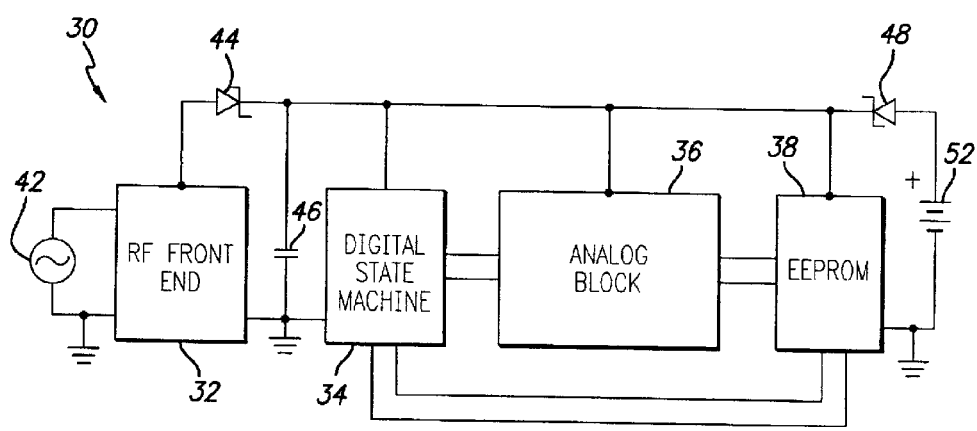
FIG. 2 is a block diagram of an embodiment of an RFID tag incorporating the dual power mode circuit of the present invention.

It should be appreciated that the two charging circuits are disparate from each other, and there is no coupling between the RF source 12 and the battery 22. Current from the RF source 12 will not flow to the battery 22, and current from the battery 22 will not flow to the RF source 12. Thus, the energy storage capacitor 14 is charged by both the RF source 12 and the battery 22. In the absence of an RF interrogating field, the RFID tag will remain powered by the battery 22 maintaining the energy storage capacitor 14 in a charged state. When the battery 22 becomes depleted, the RFID tag will be powered passively by the presence of an RF interrogating field FIG. 2 illustrates a block diagram of an exemplary RFID tag 30 incorporating the dual power mode circuit of the present invention. The exemplary RFID tag 30 includes an RF front end 32, a digital state machine 34, an analog block 36, and a memory 38. The RF front end 32 is coupled to an antenna (not shown), and may include an RF receiver that recovers analog signals that are transmitted by an RFID reader and an RF transmitter that sends data signals back to the RFID reader. The RF transmitter may further comprise a modulator adapted to backscatter modulate the impedance match with the antenna in order to transmit data signals by reflecting a continuous wave (CW) signal provided by the RFID reader. A voltage developed across the antenna inputs of the RF front end 32 by an RF field is represented by RF source 42. The digital state machine 34 provides logic that controls the functions of the RFID tag 30 in response to commands provided by the RFID reader that are embedded in the recovered RF signals. The digital state machine 34 accesses the memory 38 to read and/or write data therefrom. The analog block 36 converts analog data signals recovered by the RF interface 34 into digital signals comprising the received commands, recovers a clock from the received analog signals, and converts digital data retrieved from the memory 38 into analog signals that are backscatter modulated by the RF front end 32. The memory 38 may be provided by an EEPROM or like semiconductor memory device capable of maintaining a stored data state in absence of an applied voltage. The RF front end 32, digital state machine 34, analog block 36, and memory 38 communicate with each other through respective input/output (IO) buses, or alternatively, a common I/O bus may carry all such communications. It should be appreciated that the RF front end 32, digital state machine 34, analog block 36, and memory 38 may be provided by separate circuit elements, or may be sub-elements of a single mixed-signal integrated circuit, such as an application specific integrated circuit (ASIC), field programmable gate array (FPGA), and the like. The RFID tag 30 further includes a battery 52.

As in the embodiment of FIG. 1, the exemplary RFID tag 30 includes an energy storage capacitor 46 that provides electrical power to the digital state machine 34, it analog block 36, and memory 38. The energy storage capacitor 46 is coupled to the RF source 42 and the battery 52 in separate, respective charging circuits. A first charging circuit includes the RF source 42, a first diode 44, and the energy storage capacitor 46. The first diode 44 is coupled between the RF front end 32 and the energy storage capacitor 46 in a forward biased manner so that current from the RF source 12 flows to the energy storage capacitor 46, and not in reverse. The second charging circuit includes the battery 52, a second diode 48, and the energy storage capacitor 46. The second diode 48 is coupled between the battery 52 and the energy storage capacitor 46 in a forward biased manner so that current from the battery 52 flows to the energy storage capacitor 46, and not in reverse. In a preferred embodiment of the invention, the first and second diodes 44, 48 are provided by Schottky diodes.

The two charging circuits are disparate from each other, and there is no coupling between the RF source 42 and the battery 52. Current from the RF source 42 will not flow to the battery 52, and current from the battery 52 will not flow to the RF source 42. The energy storage capacitor 46 is charged by both the RF source 42 and the battery 52. In the absence of an RF interrogating field, the RFID tag 30 will remain powered by the battery 52 maintaining the energy storage capacitor 46 in a charged state as long as the battery has some remaining capacity. After the battery 52 becomes depleted, the RFID tag will be powered passively by the presence of an RF interrogating field It should be appreciated that the exemplary RFID tag 30 may have substantially greater read range when the battery 52 is charging the energy storage capacitor 46 (e.g., up to ten meters) than when the batter 52 is depleted and the energy storage capacitor 46 is charged solely by the RF source 42 (e.g., around one meter). Notwithstanding this reduction in read range, the RFID tag can nevertheless be passively powered using a conventional RFID reader in order to recover the information stored therein. One possible application for the RFID tag 30 having dual power charging modes would be an ultra-low current consumption, battery-powered RFID tag having extremely long life (e.g., up to ten years). Preferably, such an RFID tag would have a small size. Typical commercially available batteries that would satisfy these requirements would have very low power capacity (e.g., a rating of 25 mA-hr). Thus, the read range for such an RFID tag in the battery-powered mode would be generally comparable to the RF field-powered mode.

Having thus described a preferred embodiment of an RFID tag having a combined battery and passive power source, it should be apparent to those skilled in the art that certain advantages of the invention have been achieved. It should also be appreciated that various modifications, adaptations, and alternative embodiments thereof may be made within the scope and spirit of the present invention. The invention is further defined by the following claims.

What is claimed is:

1. An RFID transponder, comprising:
   electronic circuitry to provide RFID functionality, including an RF front end for imparting information onto a received RF signal;
   an energy storage device coupled to said electronic circuitry to provide an operational voltage thereto;
   a battery operatively coupled to said energy storage device to provide a charge thereto; and
   a rectified RF power source derived from an interrogating RF field operatively coupled to said energy storage device to provide a charge thereto, said rectified RF power source and said battery being electrically separated from each other;
   wherein, said energy storage device remains charged by said battery in the absence of said RF interrogating field while said battery has remaining capacity, and said energy storage device is charged by the presence of said RF interrogating field after said battery has become depleted.

2. The RFID transponder of claim 1, wherein said energy storage device further comprises a capacitor.

3. The RFID transponder of claim 1, further comprising a first diode coupled between said rectified RF power source and said energy storage device.

4. The RFID transponder of claim 3, further comprising a second diode coupled between said battery and said energy storage device.

5. The RFID transponder of claim 1, wherein said RF front end is further adapted to receive said interrogating RF field and provide a rectified voltage therefrom.

6. The RFID transponder of claim 1, wherein said electronic circuitry further comprises a digital state machine adapted to control operation of said RFID transponder.

7. The RFID transponder of claim 1, wherein said electronic circuitry further comprises an analog circuit block adapted to convert signals between analog and digital formats and to recover a clock signal from received analog signals.

8. The RFID transponder of claim 1, wherein said electronic circuitry further comprises a memory device adapted to store data values.

9. The RFID transponder of claim 7, wherein said memory device further comprises an electrically erasable, programmable read-only memory.

10. A method for powering an RFID transponder comprising electronic circuitry to provide RFID functionality, including circuitry for imparting information onto a received RF signal, and an energy storage device coupled to said electronic circuitry to provide an operational voltage thereto, said method comprising the steps of:

charging said energy storage device continuously from an internal battery while said battery has remaining capacity; and charging said energy storage device passively from a rectified RF power source derived from an interrogating RF field after said battery has become depleted.

11. The method of claim 10, wherein said energy storage device further comprises a capacitor.

12. The method of claim 10, further comprising the step of electrically isolating said internal battery from said rectified RF power source.

13. An RFID transponder, comprising:

electronic circuitry to provide RFID functionality, including circuitry for imparting information onto a received RF signal;

an energy storage device coupled to said electronic circuitry to provide an operational voltage thereto;

first means for charging said energy storage device from an internal power source of limited capacity; and second means for charging said energy storage device passively from an interrogating RF field;

wherein, said energy storage device remains charged by said first means in the absence of said RF interrogating field while said internal power source has remaining capacity, and said energy storage device is charged by said second means in the presence of said RF interrogating field after said limited capacity of said internal power source has been reached.

14. The RFID transponder of claim 13, wherein said energy storage device further comprises a capacitor.

15. The RFID transponder of claim 13, wherein said first charging means further comprises a battery operatively coupled to said energy storage device through a first diode.

16. The RFID transponder of claim 15, wherein said second charging means further comprises a rectified RF power source operatively coupled to said energy storage device through a second diode.

* * * * *